United States Patent
Shioya et al.

[11] Patent Number: 5,928,776
[45] Date of Patent: Jul. 27, 1999

[54] COMPOSITE MATERIAL HAVING POLYPROPYLENE FOAM LAYER

[75] Inventors: Satoru Shioya, Tochigi-ken; Takeshi Aoki, Imaichi; Satoshi Iwasaki; Hisao Tokoro, both of Utsunomiya, all of Japan

[73] Assignee: JSP Corporation, Japan

[21] Appl. No.: 08/967,362

[22] Filed: Nov. 7, 1997

[30] Foreign Application Priority Data

Nov. 8, 1996 [JP] Japan ..................................... 8-312964

[51] Int. Cl.$^6$ ................................ B32B 5/18; B32B 5/32; B29C 67/20
[52] U.S. Cl. .................... 428/316.6; 264/45.4; 264/46.6; 264/51; 428/318.6; 428/318.8; 428/319.9
[58] Field of Search .............................. 428/304.4, 318.6, 428/318.8, 319.9, 316.6; 264/50, 51, 45.4, 46.6

[56] References Cited

U.S. PATENT DOCUMENTS

| | | | |
|---|---|---|---|
| 5,188,882 | 2/1993 | Uchiyama et al. | 428/159 |
| 5,196,151 | 3/1993 | Sakaida et al. | 264/46.7 |
| 5,304,580 | 4/1994 | Shibayama et al. | 521/150 |
| 5,474,841 | 12/1995 | Matsuki et al. | 428/304.4 |

FOREIGN PATENT DOCUMENTS

| | | |
|---|---|---|
| 0 591 553 | 4/1994 | European Pat. Off. . |
| 0 658 410 | 6/1995 | European Pat. Off. . |
| 6-000891 | 1/1994 | Japan . |

*Primary Examiner*—Blaine R. Copenheaver
*Attorney, Agent, or Firm*—Lorusso & Loud

[57] ABSTRACT

A composite material having a skin layer, an intermediate, cushioning layer provided on one side of the skin layer, and a backing layer provided on the cushioning layer, wherein the backing layer is made of a non-crosslinked polypropylene resin foam and having a melting point MB in the range of 130–170° C., wherein the cushioning layer is a crosslinked polypropylene resin foamed sheet having a gel fraction of 20–70% by weight. The cushioning layer has an endothermic peak in DSC curve at a peak temperature of PC which is in the range of 130–170° C. and which is not smaller than (MB−15)° C. but not greater than (MB+10)° C. The endothermic peak has such an area at temperatures higher than MB that corresponds to a calorific value in the range of 3–30 J/g. The backing layer may be formed by expansion molding of expanded polypropylene particles within a mold cavity in which a laminate of the skin layer and the cushioning layer is placed in position.

4 Claims, 3 Drawing Sheets

200c
COMPOSITE MATERIAL HAVING POLYPROPYLENE FOAM LAYER

BACKGROUND OF THE INVENTION

This invention relates to a composite material useful as an interior material for automobiles and to a method of preparing same.

As an interior material for automobiles, a composite material having a surface skin layer and a polypropylene foam layer is utilized. One known method for preparing such a composite material includes bonding the skin layer to the foam layer with an adhesive. This method is disadvantageous from the standpoint of economy because the adhesive must be used and because the method is complicated. Another known method includes expansion molding expanded particles in a mold together with the skin layer. The composite material obtained by this process has a problem because of lack of surface softness and of formation of depressions in the skin layer corresponding to those in the foam layer.

JP-A-H6-891 discloses a method in which an extruded laminate of a polypropylene skin layer with a cushioning layer of non-crosslinked polypropylene is placed in a mold and expanded polypropylene resin particles are molded in the mold together with the laminate. This method has a problem because the composite material thus obtained has low adhesion between the laminate and the molded foamed layer of the expanded polypropylene resin. When the process conditions are changed so as to obtain satisfactory adhesion, then the cushioning layer is depressed.

SUMMARY OF THE INVENTION

It is, therefore, an object of the present invention to provide a composite material which is devoid of the drawbacks of the known material.

Another object of the present invention is to provide a composite material which has good appearance and soft touch, which shows high adhesion between adjacent layers and which is useful as an interior material for automobiles.

It is a further object of the present invention to provide a method for producing the above composite material in a simple manner.

In accomplishing the foregoing objects, there is provided in accordance with the present invention a composite material comprising a skin layer, an intermediate, cushioning layer provided on one side of said skin layer, and a backing layer provided on said cushioning layer, said backing layer being made of a non-crosslinked polypropylene resin foam and having a melting point MB in the range of 130–170° C., said cushioning layer being a crosslinked polypropylene resin foamed sheet having a gel fraction of 20–70% by weight, said cushioning layer having an endothermic peak in DSC curve at a peak temperature of PC which is in the range of 130–170° C. and which is not smaller than (MB−15)° C. but not greater than (MB+10)° C, said endothermic peak having such an area at temperatures higher than MB that corresponds to a calorific value in the range of 3–30 J/g.

In another aspect, the present invention provides a method of producing a composite material, comprising the steps of:

laminating a skin layer with a cushioning layer of a crosslinked polypropylene resin foam having a gel fraction of 20–70% by weight to obtain a laminate, placing said laminate in a mold cavity defined between first and second molds such that said skin layer is in contact with said first mold, filling said mold cavity with non-crosslinked polypropylene resin expanded particles, and feeding steam to said mold cavity to expand and mold said expanded particles, thereby to produce said composite material having said skin layer, said cushioning layer provided on said skin layer, and a backing layer of said molded expanded particles bonded to said cushioning layer, wherein said backing layer has a melting point MB in the range of 130–170° C., and wherein said cushioning layer has an endothermic peak in DSC curve at a peak temperature of PC which is in the range of 130–170° C. and which is not smaller than (MB−15)° C. but not greater than (MB+10)° C., said endothermic peak having such an area at temperatures higher than MB that corresponds to a calorific value in the range of 3–30 J/g.

BRIEF DESCRIPTION OF THE DRAWINGS

Other objects, features and advantages of the present invention will become apparent from the detailed description of the preferred embodiments of the invention which follows, when considered in the light of the accompanying drawings, in which.

DETAILED DESCRIPTION OF THE PREFERRED EMBODIMENTS OF THE INVENTION

Figure 1:
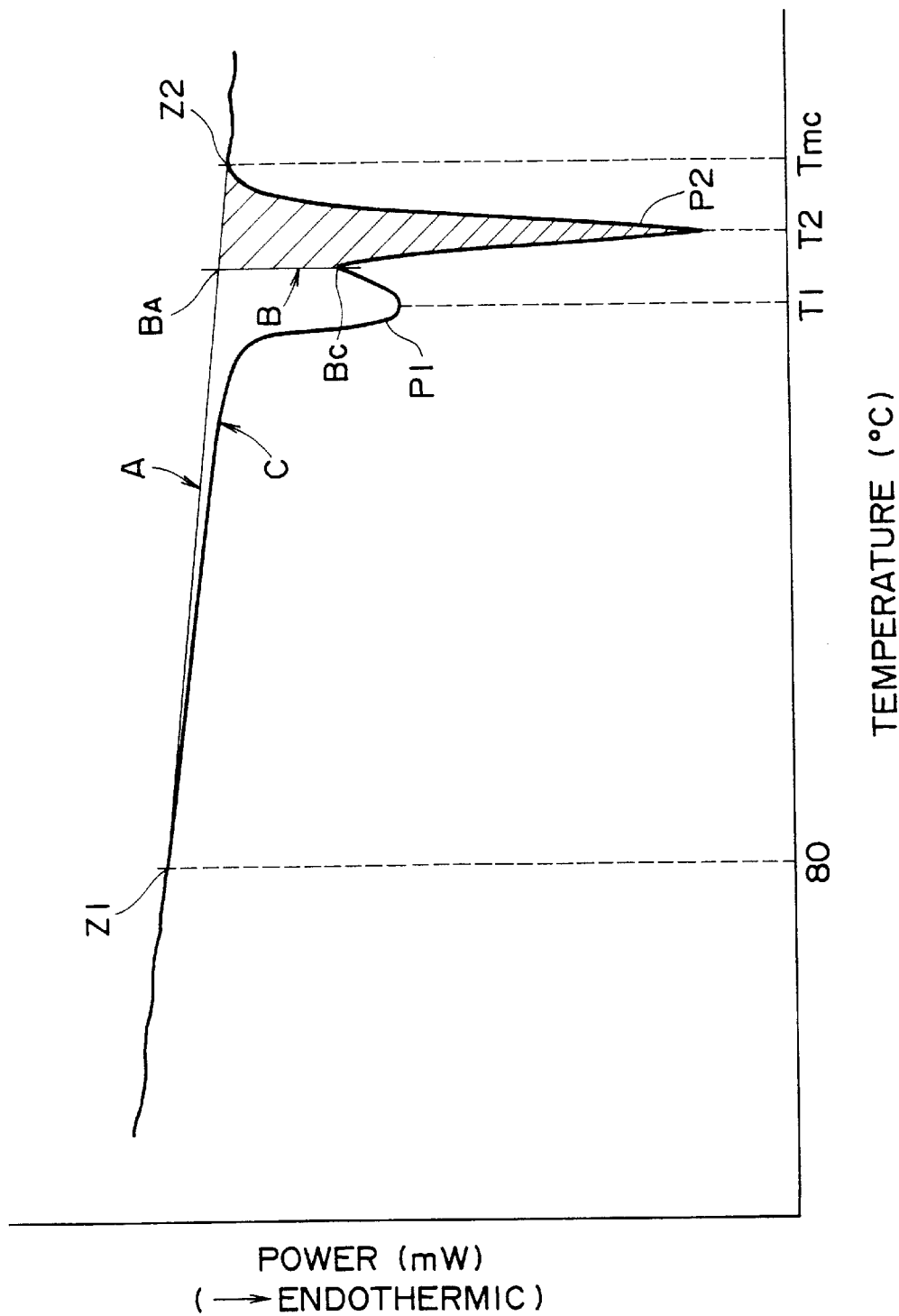
FIG. 1 is a DSC curve for explaining the melting point of a backing layer of a composite material according to the present invention.
Figure 2:
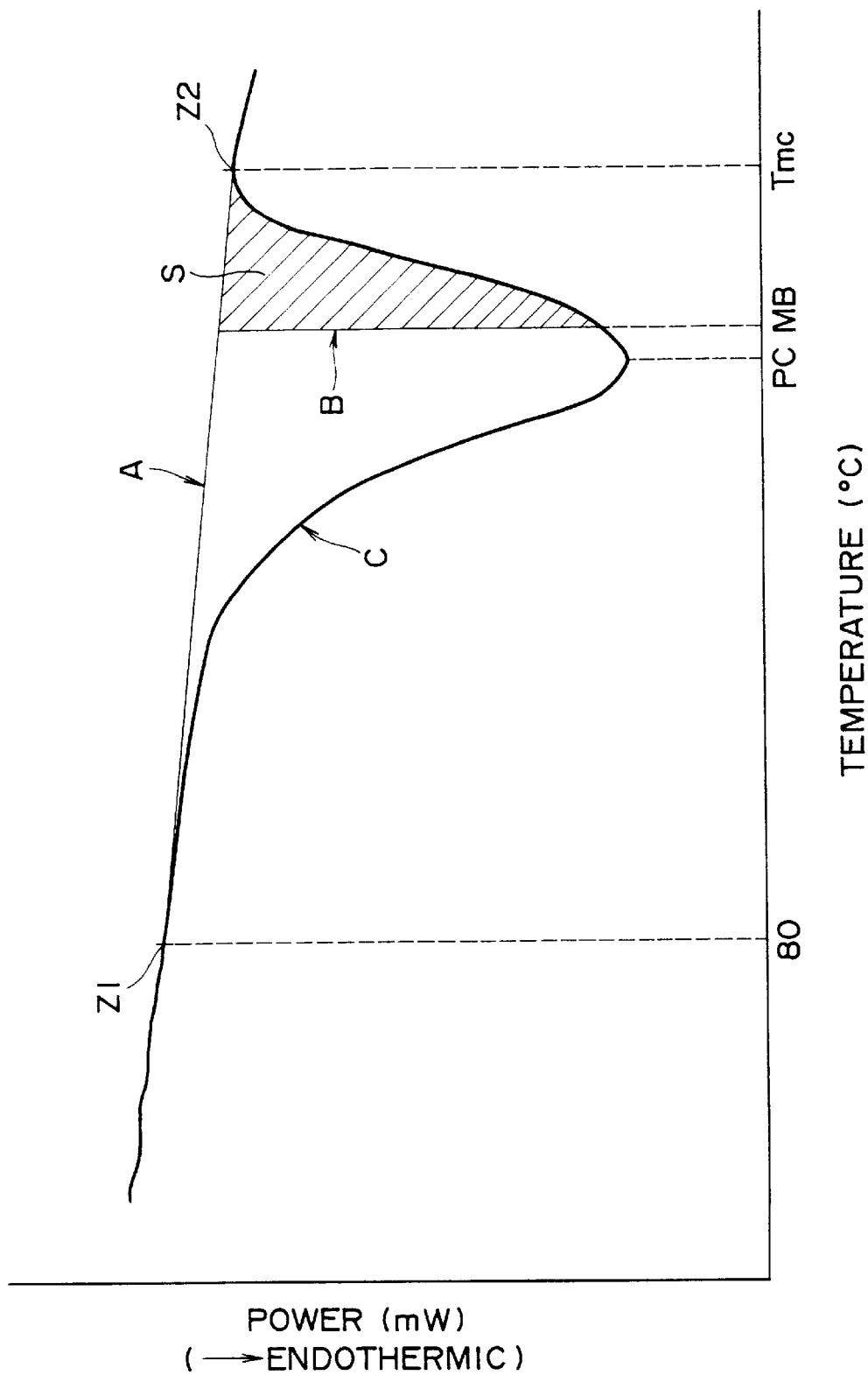
FIG. 2 is a DSC curve for explaining a specific portion S of the area of an endothermic peak of an intermediate, cushioning layer of a composite material according to the present invention.

In the present specification and claims, the terms "DSC curve". "endothermic peak", "melting point MB", "peak temperature PC", "area of an endothermic peak at temperatures higher than MB", "gel fraction" and "non-crosslinked polypropylene resin" are defined as follows:

"DSC curve" is a curve obtained by differential scanning calorimetry and examples of a DSC curves are schematically illustrated in FIGS. 1 and 2.

"Endothermic peak" is a peak in a DSC curve of a polypropylene resin caused by the absorption of heat during the course of the heating of the resin for fusing. In FIG. 1, there are two endothermic peaks P1 and P2. In FIG. 2, there is a single endothermic peak.

"Melting point MB" is a melting point of a molded, foamed polypropylene resin layer (backing layer) of a composite material according to the present invention as determined by the DSC analysis and is measured in the following manner. A portion of the backing layer is cut out and is pressed at a temperature of 200° C. The pressed product is cut to obtain a sample having a weight of 5 mg. The sample is subjected to DSC analysis. Thus, the sample is heated at a rate of 10° C./min to 200° C. in an atmosphere of nitrogen to obtain a first DSC curve. The heated sample is then cooled at a rate of 10° C./min to about 40° C.

Thereafter, the sample is again heated at a rate of 10° C./min to 200° C. in an atmosphere of nitrogen to give a second DSC curve. The peak temperature of the endothermic peak in the range of 130–170° C. in the second DSC curve represents the melting point MB.

When the backing layer contains two or more different polypropylene resins, two or more endothermic peaks may be observed in the second DSC curve as shown in FIG. 1. In this case, the melting point MB is the peak temperature of that peak which has the largest peak area among these peaks. In this case, when there are a plurality of peaks having the same largest peak areas, then the melting point MB is an average of the peak temperatures of those peak temperatures of the largest peak areas.

For example, the melting point MB is determined as follows. In the DSC curve C having two endothermic peaks P1 and P2 at peak temperatures T1 and T2, respectively, as shown in FIG. 1, a straight line A extending between the point Z1 in the curve at 80° C. and the point Z2 in the curve at the melt completion temperature $T_{mc}$ is drawn. The melt completion temperature $T_{mc}$ is determined from the DSC curve and represents the temperature at which the endothermic peak ends. Next, a line B which is parallel with the ordinate and which crosses the line A at a point $B_A$ and the DSC curve C at a point $B_C$ between the temperature T2 and T1 is drawn. The position of the point $B_C$ is such that the length between the point $B_A$ and the point $B_C$ is minimum. The shaded portion and white portion defined by the lines. A, B and C represent the areas of the peaks P1 and P2, respectively. When the shaded area is greater than the white area, as shown in FIG. 1, the peak temperature T2 is the melting point MB of the resin. If the shaded area is the same as the white area, then the melting point MB of the resin is (T1+T2)/2.

"Peak temperature PC" is a peak temperature of the endothermic peak in a DSC curve of a polypropylene resin foam sheet (intermediate, cushioning layer) of a composite material according to the present invention, as illustrated in FIG. 2. The DSC curve herein is as obtained by the differential scanning calorimetric analysis wherein a sample is heated from room temperature to 200° C. at a rate of 10° C./min in an atmosphere of nitrogen. At the peak temperature PC, the endothermic peak shows the minimum power.

When the intermediate, cushioning layer contains two or more different polypropylene resins, two or more endothermic peaks may be observed in the DSC curve. In this case, the peak temperature PC is determined in the same manner as described with reference to the determination of the melting point MB. Namely, the peak temperature PC is the peak temperature of that peak which has the largest peak area among these peaks. In this case, when there are a plurality of peaks having the same largest peak areas, then the peak temperature PC is an average of the peak temperatures of those peak temperatures of the largest peak areas.

"Area of an endothermic peak at temperatures higher than MB" represents a part of the calorific value of an endothermic peak at temperatures higher than MB in a DSC curve of a polypropylene resin foam sheet (intermediate, cushioning layer) of a composite material according to the present invention. This area is determined as follows. In the DSC curve C as shown in FIG. 2, a straight line A extending between the point Z1 in the curve C at 80° C. and the point Z2 in the curve at the melt completion temperature $T_{mc}$ is drawn. The area defined between the curve C and the line A represents a total calorific value TS required for fusing the resin. Next, a line B which is parallel with the ordinate is drawn at a temperature equal to the melting point MB. The area S defined by the line A, line B and DSC curve C represents the area of an endothermic peak at temperatures higher than MB. Thus, the area S is a part of the total calorific value TS required for fusing the resin.

"Gel fraction" of a polypropylene resin foam sheet (intermediate, cushioning layer) represents the degree of cross-linking of the resin and is determined as follows. Sample resin foam sheet (about 1 g) is immersed in xylene (200 ml) and the mixture is refluxed for 8 hours. The mixture is then immediately filtered through a 200 mesh (74 μm) wire net (specified in Japanese Industrial Standard JIS Z8801 (1966)). The xylene-insoluble matters left on the sieve is dried in vacuum for 24 hours and again immersed in xylene (200 ml). The mixture is refluxed for 8 hours and then immediately filtered through a 200 mesh wire net. The weight of the xylene-insoluble matters left on the sieve and dried under vacuum for 24 hours is measured. The gel fraction P is defined as follows:

$$P\ (\%)=(G/W)\times 100$$

wherein G represents the weight (g) of the xylene-insoluble matters and W represents the weight (g) of the sample.

"Non-crosslinked polypropylene resin" is intended to refer to a polypropylene resin having a gel fraction of not greater than 0.5% by weight. The gel fraction herein is as measured by the above-described method.

The composite material according to the present invention comprises a skin layer, an intermediate, cushioning layer and a backing layer superimposed in this order.

The skin layer is generally made of a synthetic polymeric material having a good decorative appearance and excellent physical, mechanical and chemical properties required for use as an interior material for housings and vehicles such as automobiles. Illustrative of suitable skin layer materials are polyvinyl chloride sheets, polyolefin elastomer sheets, woven or non-woven polyester fabrics and woven or non-woven polypropylene fabrics. The surface of the skin layer may be provided with crimp or other decorations. The skin layer preferably has a thickness of 0.2–10 mm.

Laminated on a back side of the skin layer is an intermediate, cushioning layer of a crosslinked polypropylene resin foamed sheet. The cushioning layer is preferably laminated on the skin layer by melt-adhesion. If fuse bonding is difficult to perform, then an adhesive may be used for bonding the skin layer and the cushioning layer. The cushioning layer preferably has a thickness of 0.5–10 mm and an expansion ratio of 5–50, more preferably 10–45.

The polypropylene resin for use in the cushioning layer generally contains at least 30% by weight of a propylene homopolymer or a propylene copolymer having a propylene content of at least 70% by weight. The propylene copolymer may be, for example, a propylene-ethylene block copolymer, a propylene-ethylene random copolymer, a propylene-butane random copolymer or a propylene-ethylene-butene random copolymer and preferably has a melting point of 130° C. or more.

The polypropylene resin may further contain an additional polymer, preferably a polyolefin polymer. Examples of such additional polymers include polyethylene resins such as linear very low density polyethylene, branched low density polyethylene, linear low density polyethylene, medium density polyethylene and high density polyethylene; polyolefin elastomers such as ethylene-propylene rubber, ethylene-butene rubber, ethylene-octene rubber and propylene-butene rubber; and polybutene resins. For reasons of softness, the melting point of such additional polymers, if any, is preferably less than 140° C., more preferably no more than 135° C., most preferably no more than 130° C.

The crosslinked polypropylene resin foamed sheet may be prepared by a method including the steps of extruding a mixture containing the above polypropylene resin, a heat-decomposable blowing agent and, if necessary, an additive at a temperature at which the blowing agent is not decomposed, thereby to obtain a sheet-like extrudate. The extrudate is then subjected to cross-linking and then heated to decompose the blowing agent and to obtain a foamed sheet.

The crosslinking may be performed by irradiation with an electric beam, by reaction with a peroxide crosslinking agent or by silane crosslinking. When the electric beam irradiation or peroxide crosslinking is adopted, a crosslinking aid or a peroxide crosslinking agent is incorporated into the sheet-like extrudate as an additive. When the silane crosslinking is adopted, at least part of the polypropylene resin should be modified (grafted) with a silane compound.

Any blowing agent of a heat-decomposition type customarily used for expanding a polypropylene resin may be used for the purpose of the present invention. Examples of blowing agents include azodicarbonamide, azobisformamide, N,N-dinitrosopentamethylenetetramine, diazoaminobenzene, benzensulfonylhydrazide, p,p'-oxybisbenzenesulfonyl-hydrazide, N,N'-dimethyl-N,N'-dinitrosoterephthalamide and mixtures thereof. Above all, the use of azodicarbonamide is preferred for reasons of thermal stability and adequate decomposition temperature thereof. The blowing agent is preferably used in an amount of 0.2–30 parts by weight, more preferably 0.5–20 parts by weight, per 100 parts by weight of the polypropylene resin.

It is important that the crosslinked polypropylene foamed sheet (intermediate, cushioning layer) has a gel fraction in the range of 20–70% by weight. A gel fraction of the cushioning layer exceeding 70% by weight is undesirable, because the adhesion between the cushioning layer and the backing layer is unsatisfactory. When the gel fraction is below 20% by weight, on the other hand, the cushioning layer is compressed and loses the cushioning property during the formation of the backing layer on the cushioning layer.

It is also important that the cushioning layer should have an endothermic peak in DSC curve at a peak temperature of PC which is in the range of 130–170° C. and which is not smaller than (MB−15)° C. but not greater than (MB+10)° C., where MB represents the melting point of the backing layer provided on the cushioning layer and is in the range of 130–170° C. Namely, the peak temperature PC should meet the following conditions:

130° C.≦PC≦170° C.

(MB−15)° C.≦PC≦(MB+10)° C.

130° C,≦MB≦170° C.

When the peak temperature PC is smaller than (MB−15)° C., the cushioning layer is compressed and loses the cushioning property during the formation of the backing layer on the cushioning layer. When the peak temperature PC is greater than (MB+15)° C., the adhesion between the cushioning layer and the backing layer is unsatisfactory.

It is further essential that the endothermic peak of the cushioning layer in DSC curve thereof should have such an area at temperatures higher than MB that corresponds to a calorific value in the range of 3–30 J/g (Joule per gram), preferably 4–25 J/g. When the area at temperatures higher than MB is smaller than 3 J/g, the cushioning layer is compressed and loses the cushioning property during the formation of the backing layer on the cushioning layer. When the area at temperatures higher than MB is greater than 30 J/g, the adhesion between the cushioning layer and the backing layer is unsatisfactory.

The intermediate, cushioning layer is provided between the skin layer and the backing layer of a non-crosslinked polypropylene resin foam. The backing layer has a melting point MB in the range of 130–170° C., preferably 135–155° C., and is preferably 5–500 mm thick.

The non-crosslinked polypropylene resin for use in the backing layer generally contains at least 70% by weight of a propylene homopolymer or a propylene copolymer having a propylene content of at least 70% by weight. The propylene copolymer may be, for example, a propylene-ethylene block copolymer, a propylene-ethylene random copolymer, a propylene-butene random copolymer or a propylene-ethylenebutene random copolymer.

The non-crosslinked polypropylene resin may further contain an additional polymer, preferably a polyolefin polymer. Examples of such additional polymers include polyethylene resins such as linear very low density polyethylene, branched low density polyethylene, linear low density polyethylene, medium density polyethylene and high density polyethylene; polyolefin elastomers such as ethylene-propylene rubber, ethylene-butene rubber, ethylene-octene rubber and propylene-butene rubber; and polybutene resins.

Figure 3:
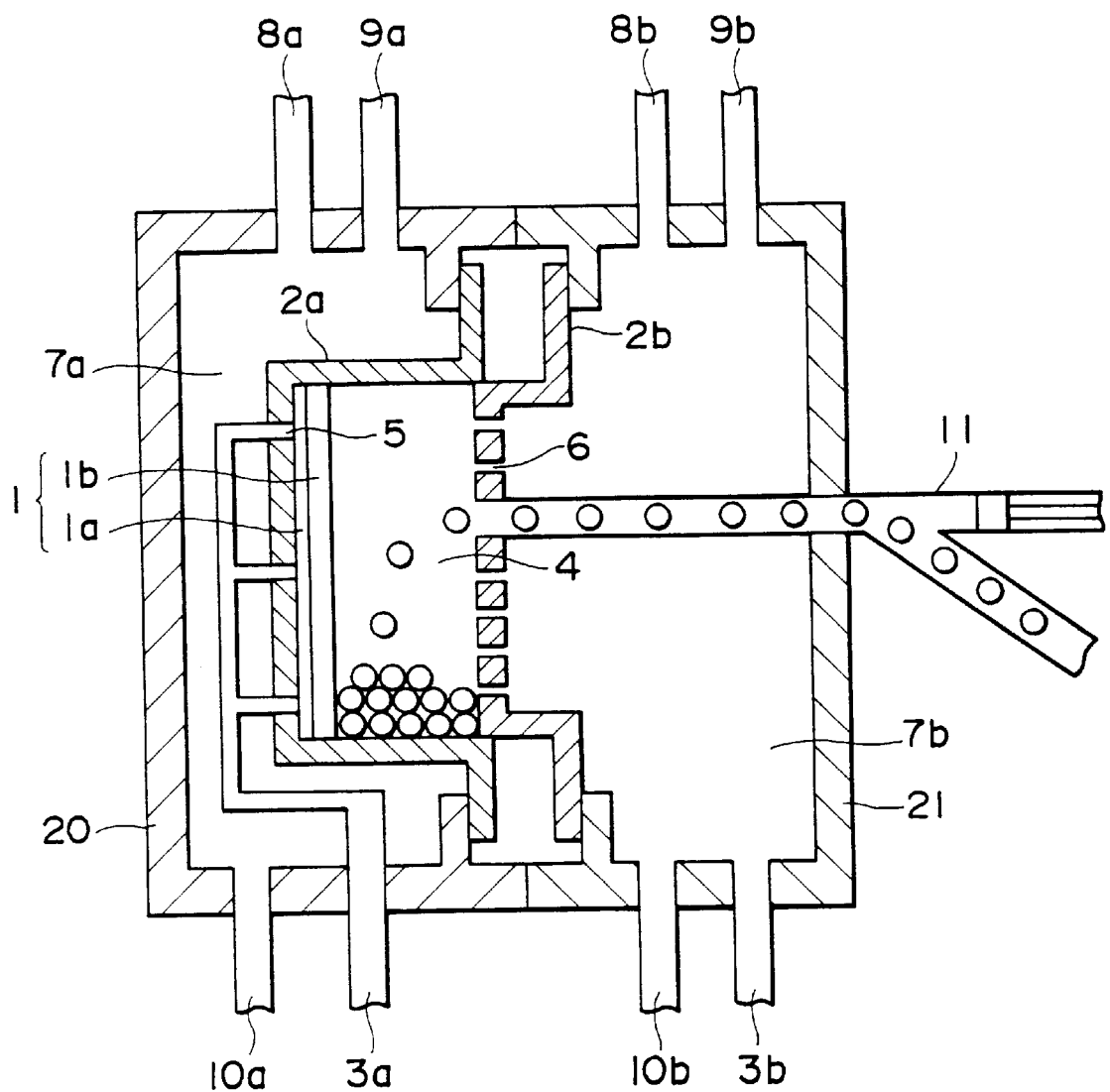
FIG. 3 is a cross-sectional, elevational view diagrammatically illustrating a molding device used for carrying out a method according to the present invention.

A method for preparing the composite material according to the present invention will now be described with reference to FIG. 3 which illustrates one preferred device for carrying out the method of the present invention. The device has a pair of first and second frames 20 and 21 in which a pair of first and second molds 2a and 2b are disposed, respectively, to define first and second chamber 7a and 7b therebetween, respectively. The frame 20 is moveable relative to the frame 21 so that the first and second molds 2a and 2b are positionable between open and close positions. In the close position as shown in FIG. 3, a mold cavity 4 is defined between the molds 2a and 2b.

A laminate 1 composed of the skin layer 1a and the cushioning layer 1b is placed in the mold cavity 4 such that the skin layer 1a faces the first mold 2a. The mold cavity 4 is then evacuated through a suction tube 3a and perforations 5 so that the laminate 1 is maintained in contact with the first mold 2a. If necessary, the laminate may be previously shaped to fit the inside surface of the first mold 2a. Alternatively, the laminate may be shaped by press molding with the first mold 2a. In this case, the laminate may be heated during the press molding, as desired.

The mold cavity 4 is then filled with expanded particles of a non-crosslinked polypropylene resin introduced through a feeder 11. The expanded particles may be obtained by any known suitable method. In one suitable method, non-expanded polypropylene resin particles are contacted with a blowing agent such as an inorganic gas, a volatile blowing agent or a mixture thereof to impregnate the resin particles with the blowing agent, heated to a temperature higher than the softening point of the resin, dispersed in a dispersing medium, maintained under a pressurized condition in a vessel and then discharged into air so that the resin particles are expanded. The expanded resin particles preferably have a bulk expansion ratio of 3–60, more preferably 3–20, and preferably contain secondary crystals.

The expanded polypropylene resin particles in the mold cavity 4 are then heated with pressurized steam supplied through a pipe 8b to the second chamber 7b and slits 6 so that the particles are expanded and fuse bonded to each other, thereby to form a backing layer having a closed cellular structure and bonded to the laminate 1. A pressurized steam may also be fed through a pipe 8a to the first chamber 7a to heat the laminate 1 and to prevent the curling of the product. In this case, it is advisable not to permit the steam to enter the perforations 5 so that the skin layer is prevented from being deteriorated. The backing layer thus produced preferably has an expansion ratio of 10–45, more preferably 3–25, and is harder than the cushioning layer.

Before expanding the expanded particles, it is preferable to substitute steam for air present between the expanded particles charged in the mold cavity 4. Thus, a drain discharge pipe 10b is connected to the second chamber 7b and is maintained in an open state so that the steam fed to the chamber 7b through the pipe 8b is discharged together with air, before commencing the expansion of the expanded particles. In this case, the second chamber 7b may be evacuated through a suction tube 3b to facilitate the removal of the air. In FIG. 3, designated as 9a and 9b are cooling water feeding conduits and as 10a is a drain discharge pipe.

The following examples will further illustrate the present invention. Parts and percentages are by weight.

EXAMPLES 1–5 AND COMPARATIVE EXAMPLES 1–6

A silane-modified polypropylene (SMP), dioctyl tin dilaurate (silanol condensation catalyst; SCC), a non-modified polyolefin (PO) and a blowing agent (azodicarbonamide; BA) as shown in Table 1 were charged in an extruder in amounts shown in Table 1 and kneaded while substantially preventing the decomposition of the blowing agent.

TABLE 1

| Example No. | SMP | Amount of SMP (part) | Amount of SCC (part) | PO | Amount of PO (part) | Amount of BA (part) |
|---|---|---|---|---|---|---|
| 1 | SMP1*1 | 75 | 3.75 | PO-1*6 | 25 | 12 |
| 2 | SMP1*1 | 60 | 3.0 | PO-1*7 | 40 | 16 |
| 3 | SMP1*1 | 40 | 2.0 | PO-1*7 | 60 | 12 |
| 4 | SMP1*1 | 75 | 3.75 | PO-1*8 | 25 | 12 |
| 5 | SMP1*1 | 100 | 5.0 | — | — | 12 |
| Comp. 1 | SMP1*2 | 50 | 2.5 | PO-1*9 | 50 | 12 |
| Comp. 2 | SMP1*3 | 100 | 5.0 | — | — | 12 |
| Comp. 3 | SMP1*4 | 100 | 5.0 | — | — | 12 |
| Comp. 4 | SMP1*4 | 25 | 1.25 | PO-1*10 | 75 | 12 |
| Comp. 5 | SMP1*1 | 60 | 3.0 | PO-1*2 | 40 | 12 |
| Comp. 6 | SMP1*5 | 100 | 5.0 | — | — | 12 |

*1 Silane-modified propylene-ethylene random copolymer, melting point: 151° C., melt flow rate (according to JIS K6747-1981, paragraph 4.3): 9 g/10 minutes;
*2 Silane-modified propylene-ethylene block copolymer, melting point: 160° C., melt flow rate (according to JIS K6747-1981, paragraph 4.3): 11 g/10 minutes;
*3 Silane-modified propylene-ethylene random copolymer, melting point: 132° C., melt flow rate (according to JIS K6747-1981, paragraph 4.3): 10 g/10 minutes;
*4 Silane-modified propylene-ethylene random copolymer, melting point: 146° C., melt flow rate (according to JIS K6747-1981, paragraph 4.3): 10 g/10 minutes;
*5 Silane-modified propylene-ethylene random copolymer, melting point: 154° C., melt flow rate (according to JIS K6747-1981, paragraph 4.3): 10 g/10 minutes;
*6 linear low density polyethylene, density: 0.922 g/cm$^3$, melting point: 124° C., melt flow rate (according to JIS K6748-1981, paragraph 4.4): 5 g/10 minutes;
*7 branched low density polyethylene, density: 0.922 g/cm$^3$, melting point: 105° C., melt flow rate (according to JIS K6748-1981, paragraph 4.4): 2.4 g/10 minutes;
*8 propylene-ethylene random copolymer, melting point: 138° C., melt flow rate (according to JIS K6747-1981, paragraph 4.3): 8 g/10 minutes;
*9 low density polyethylene, density: 0.922 g/cm$^3$, melting point: 121° C., melt flow rate (according to JIS K6748-1981, paragraph 4.4): 2 g/10 minutes;
*10 propylene-ethylene random copolymer, melting point: 146° C., melt flow rate (according to JIS K6747-1981, paragraph 4.3): 1.5 g/10 minutes;

The kneaded mass was then extruded through a T-die to form a foamable sheet. The sheet was aged at 60° C. for 48 hours in a moistened condition to crosslink the resin. The crosslinked sheet was passed through an oven at 230° C. to obtain a foamed sheet having physical properties shown in Table 2.

TABLE 2

| Example No. | Expansion ratio | Gel fraction (%) | Thickness (mm) | TS*11 (J/g) | S*12 (J/g) | PC*13 (° C.) |
|---|---|---|---|---|---|---|
| 1 | 31.1 | 57 | 6.0 | 75.9 | 14.5 | 147.2 |
| 2 | 20.6 | 40 | 3.1 | 56.5 | 12.1 | 149.0 |
| 3 | 19.2 | 29 | 3.7 | 61.4 | 10.0 | 150.0 |
| 4 | 17.8 | 57 | 3.5 | 64.7 | 18.5 | 146.0 |
| 5 | 19.6 | 65 | 2.5 | 67.3 | 21.5 | 147.8 |
| Comp. 1 | 21.8 | 42 | 2.8 | 72.8 | 24.4 | 157.6 |
| Comp. 2 | 21.2 | 68 | 2.4 | 44.7 | 4.5 | 130.1 |
| Comp. 3 | 20.8 | 75 | 2.3 | 61.2 | 8.8 | 145.3 |
| Comp. 4 | 21.5 | 15 | 2.0 | 62.3 | 8.1 | 144.7 |
| Comp. 5 | 20.8 | 40 | 3.1 | 68.7 | 2.0 | 149.0 |
| Comp. 6 | 30.0 | 69 | 3.0 | 74.8 | 32.1 | 154.0 |
| Comp. 7 | 22.4 | 0 | 3.3 | 78.6 | 55.4 | 157.6 |

*11 The total calorific value required for fusing the polypropylene resin foam sheet (as defined above)
*12 The area of an endothermic peak at temperatures higher than MB (as defined above)
*13 Peak temperature (as defined above)

Each of the crosslinked foamed sheet thus obtained was laminated with a skin layer of a thermoplastic polyolefin elastomer having a thickness of 0.4 mm and provided with crimp patterns using a hot melt adhesive (HIRODINE 7514 manufactured by Hirodine Industrial Co., Ltd.) to obtain a laminate. The laminate was cut into a square with a side length of 200 mm and then placed in a mold cavity having a size of 200×200×20 mm of the mold device as shown in FIG. 3. The mold cavity 4 was evacuated by a vacuum pump through the suction pipe 3a so that the skin layer of the laminate was held in contact with the first mold 2a. Expanded particles of a propylene-ethylene random copolymer (ethylene content: 2.4%, melting point: 146.0° C., bulk expansion ratio: 15) whose cells had been previously adjusted to an air pressure of 2.5 atm were filled in the mold cavity 4. While maintaining the drain discharge pipe 10b open, steam was fed to the second chamber 7b for 5 seconds to purge the air between the expanded particles in the mold cavity 4. The drain pipe 10b was then closed and steam at 3.8 kg/cm$^2$G was fed to the second chamber 7b, while feeding steam at 2.0 kg/cm$^2$G to the first chamber 7a, so that the expanded particles were fused and expanded. After cooling with water, the molding in the mold cavity 4 was taken out, aged at 60° C. for 24 hours and the cooled to room temperature to obtain a composite material having a foamed backing layer bonded to the laminate. In Comparative Example 5, expanded particles having a melting point of 162° C. were used and the steam pressure for molding had a pressure of 5 kg/cm$^2$G.

COMPARATIVE EXAMPLE 7

A commercially available polypropylene resin (SD632 manufactured by Montel Inc.) was extruded through a circular die using butane as a blowing agent to obtain a foamed sheet having physical properties shown in Table 2. The foamed sheet was laminated with a skin layer of a thermoplastic polyolefin elastomer having a thickness of 0.4 mm and provided with crimp patterns using a hot melt adhesive in the same manner as that of the above examples. A backing layer was formed on the foamed sheet of the laminate in the same manner as that of the above examples to obtain a composite material.

EXAMPLES 6–9

Example 1 was repeated in the same manner as described except that commercially available polypropylene foamed sheets having the properties shown in Table 3 were each substituted for the crosslinked foamed sheet used in Example 1, thereby obtaining composite materials.

TABLE 3

| Example No. | Expansion ratio | Gel fraction (%) | Thickness (mm) | TS*11 (J/g) | S*12 (J/g) | PC*13 (° C.) |
|---|---|---|---|---|---|---|
| 6*14 | 18.2 | 38 | 2.9 | 73.8 | 6.6 | 141.0 |
| 7*15 | 14.5 | 67 | 2.9 | 66.3 | 6.8 | 138.8 |
| 8*16 | 19.1 | 51 | 3.0 | 62.0 | 7.8 | 139.0 |
| 9*17 | 21.7 | 50 | 2.0 | 61.2 | 4.0 | 139.3 |

*11 The total calorific value required for fusing the polypropylene resin foam sheet (as defined above)
*12 The area of an endothermic peak at temperatures higher than MB (as defined above)
*13 Peak temperature (as defined above)
*14 TORAY PEF AW 60 manufactured by Toray Ltd.
*15 TORAY PEF AP 61 manufactured by Toray Ltd.
*16 TORAY PEF AP 66 manufactured by Toray Ltd.
*17 SOFTLON PP manufactured by Sekisui Chemical Inc.

Each of the composite materials thus produced was evaluated for the adhesion between the backing layer and the laminate thereof, softness of the skin layer thereof and the surface appearance thereof. The evaluation was made as follows:

Adhesion

The composite material is cut into 9 equivalent samples. The skin layer of each sample is peeled with fingers from the sample to expose the backing layer. That portion SA of the exposed surface area of the backing layer to which the polypropylene foamed sheet (intermediate layer) is adhered is measured. The number of the samples in which the area SA is 85% or more based on the total area of the exposed surface of the backing layer is counted. The adhesion is evaluated according to the following ratings:

A: the number is 8 or 9

B: the number is 2–7

C: the number is 0 or 1

Softness

The composite material is cut into four equivalent parts (i.e. each part has a size of 50×50×20 mm). One of the parts (sample (A)) is compressed in the thickness direction to 20% of the original thickness (i.e. a thickness of 4 mm) at a pressing speed of 10 mm/minute and a temperature of 20° C. in accordance with the method speculated in Japanese Industrial Standard JIS Z0234 while measuring a stress-strain curve. From this curve, an energy absorption (kg.cm/cm$^3$) E1 of the sample (A) is calculated as follows:

$$E1 = S1 \times F1 \times 0.1$$

wherein S1 represents a stress (kg/cm$^2$) at the 10% strain and F1 represents an energy absorption efficiency (cm/cm) up to the 10% strain. Similar procedure is repeated for a sample (B) without the laminate (i.e. backing layer only) prepared by expansion molding of the same expanded particles as used in the preparation of the composite material. An energy absorption (kg.cm/cm$^3$) E2 of the sample (B) is calculated as follows:

$$E2 = S2 \times F2 \times 0.1$$

wherein S2 represents a stress (kg/cm$^2$) at the 10% strain and F2 represents an energy absorption efficiency (cm/cm) up to the 10% strain. The softness is evaluated according to the following ratings:

A: E2>E1 (good)

B: E2≦E1 (no good)

Surface Appearance

The surface appearance of the composite material is observed with naked eyes and is evaluated according to the following ratings:

A: The backing layer cannot at all or can hardly see through the skin layer (good)

B: The backing layer can markedly see through the skin layer (no good)

The results are summarized in Table 4.

TABLE 4

| Example No. | Adhesion | Softness | Surface Appearance |
|---|---|---|---|
| 1 | A | A | A |
| 2 | A | A | A |
| 3 | A | A | A |
| 4 | A | A | A |
| 5 | A | A | A |
| 6 | A | A | A |
| 7 | A | A | A |
| 8 | A | A | A |
| 9 | A | A | A |
| Comp. Ex. 1 | C | A | A |
| Comp. Ex. 2 | A | B | B |
| Comp. Ex. 3 | B | A | A |
| Comp. Ex. 4 | A | B | B |
| Comp. Ex. 5 | A | B | B |
| Comp. Ex. 6 | B | A | A |
| Comp. Ex. 7 | A | B | B |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A composite material comprising a skin layer, an intermediate, cushioning layer provided on one side of said skin layer, and a backing layer provided on said cushioning layer, said backing layer being made of a non-crosslinked polypropylene resin foam formed from polypropylene expanded particles and having a melting point MB in the range of 130–170° C., said cushioning layer being a crosslinked polypropylene resin foamed sheet having a gel fraction of 20–70% by weight, an expansion ratio of 10–45 and a thickness of 0.5–6 mm.

said cushioning layer having an endothermic peak in DSC curve at a peak temperature of PC which is in the range of 130–170° C. and which is not smaller than (MB−15)° C. but not greater than (MB+10)° C., said endothermic peak having such an area at temperatures higher than MB that corresponds to a calorific value in the range of 3–30 J/g and a total area corresponding to a calorific value in the range of 56.5–75.9 J/g.

2. A composite material as claimed in claim 1, wherein said endothermic peak of said cushioning layer has such an area at temperatures higher than MB that corresponds to a calorific value in the range of 4–25 J/g.

3. A method of producing a composite material, comprising the steps of:

laminating a skin layer with a cushioning layer of a crosslinked polypropylene resin foam having a gel fraction of 20–70% by weight to obtain a laminate, placing said laminate in a mold cavity defined between first and second molds such that said skin layer is in contact with said first mold, filling said mold cavity with non-crosslinked polypropylene resin expanded particles, and feeding steam to said mold cavity to expand and mold said expanded particles, thereby to produce said composite material having said skin layer, said cushioning layer provided on said skin layer, and a backing layer of said molded expanded particles bonded to said cushioning layer, wherein said backing layer has a melting point MB in the range of 130–170° C., and wherein said polypropylene resin foam of said cushioning layer has an expansion ratio of 10–45, a thickness of 0.5–6.0 mm and an endothermic peak in DSC curve at a peak temperature of PC which is in the range of 130–170° C. and which is not smaller than (MB−15)° C. but not greater than (MB+10)° C., said endothermic peak having such an area at temperatures higher than MB that corresponds to a calorific value in the range of 3–30 J/g and having a total area corresponding to a calorific value in the range of 56.5–75.9 J/g.

4. A method as claimed in claim 3, wherein said endothermic peak of said cushioning layer has such an area at temperatures higher than MB that corresponds to a calorific value in the range of 4–25 J/g.

* * * * *